3,104,154
GRAFT COPOLYMER CONTAINING SPINNABLE
SOLUTION AND METHOD FOR PREPARING
AND SPINNING THEREOF
Saichi Morimoto, Otsu, Masao Ishihara, Sakyo-ku, Kyoto, and Akira Yamamoto, Kazuto Hamada, Koichi Imai, and Masamichi Otsuka, Shiga-gun, Shiga-ken, Japan, assignors to Toyo Spinning Co., Ltd., Kita-ku, Osaka, Japan
Filed Feb. 5, 1962, Ser. No. 171,281
Claims priority, application Japan Feb. 9, 1961
8 Claims. (Cl. 18—54)

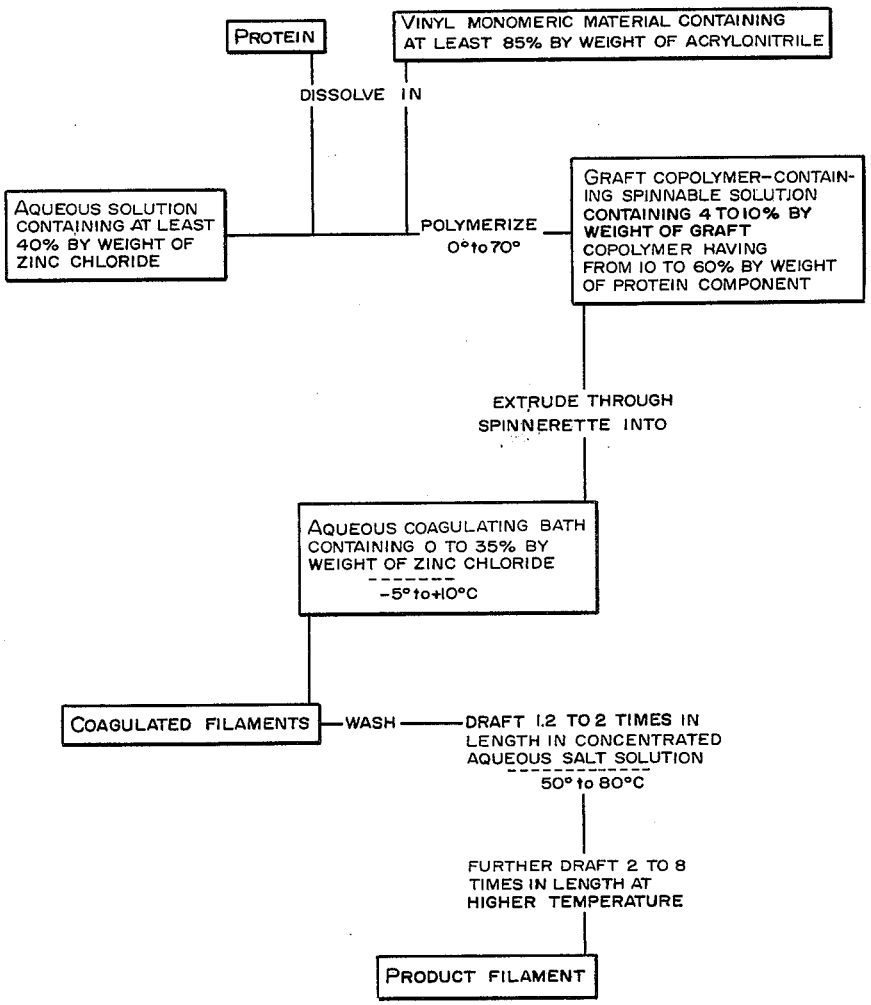

The present invention relates to a method for the production of fibres consisting substantially of modified polyacrylonitrile or acrylonitrile graft copolymer, and more particularly to the preparation of improved fibre-forming or spinnable solutions of graft copolymers of acrylonitrile and a protein.

In order to improve various properties of polyacrylonitrile type fibres, it has been proposed to polymerize monomeric acrylonitrile or a monomeric mixture of acrylonitrile and other vinyl monomer(s) in the presence of a vinyl polymer such as polyvinyl alcohol, polyvinyl pyrrolidone, polyvinyl pyridine, etc. having superior dye-receptivity, and to form the resulting copolymer into fibres. According to this method, it has been intended that the radical polymerizable monomeric material is graft-copolymerized with the readily dyeable polymer in order to avoid various difficulties encountered with the so-called polymer blend method. However, according to this grafting method, the graft polymerization takes place only to a very limited extent, a major portion of the grafting monomeric material being consumed in the homopolymerization of the monomer. Thus, when a primary or trunk polymer and a desired large amount of a grafting monomeric material (which, when homopolymerized, would produce a homopolymer incompatible with the said primary or trunk polymer) are subjected to the conventional graft copolymerization, there would be produced a mixture of a small amount of the desired graft copolymer and a relatively large amount of the homopolymer of the grafting monomeric material which is incompatible or poorly miscible with the graft copolymer. The resulting product would incur various difficulties similar to those encountered with the conventional polymer blends, such as difficulties in finding a satisfactory solvent common to the graft copolymer and homopolymer, phase separation, etc. Thus, the conventional graft copolymerization method of this type does not differ much, in effect, from the so-called polymer-blend method.

It has been found that when monomeric acrylonitrile is polymerized in the presence of a protein in a homogeneous aqueous solution system comprising a concentrated aqueous solution of zinc chloride as the polymerization medium, there is obtained a substantially homogeneous, spinnable solution containing a protein-acrylonitrile graft copolymer substantially free of homopolymer. This remarkable effect is evidenced by the following fact. A protein and acrylonitrile monomer are dissolved in a concentrated aqueous solution of zinc chloride and the mixture is subjected to polymerization while maintaining a homogeneous solution system throughout the entire polymerization period. The product contained in the resulting solution is separated and recovered, and the solid product recovered is then heated for a prolonged period of time in a solvent such as dimethyl formamide which is capable of selectively dissolving polyacrylonitrile. In this case only a little swell is observed on the solid and there is substantially no evidence of dissolution. If a portion of the solvent after the use for this treatment is diluted with water, only a slight clouding is seen, but no appreciable precipitation of homopolymer or polyacrylonitrile is observed. As to the factors which would account for this rather surprising result of this invention, the following could be mentioned:

(1) Protein dissolves in a concentrated aqueous solution of zinc chloride containing monomeric acrylonitrile to form a stable solution.

(2) Protein is abundant with a number of radicals such as amino, carboxylic, amide, active methylene and other radicals, which serve as active sites in radical reaction.

(3) A concentrated aqueous solution of zinc chloride has a tendency to sensitize the active radicals in the attack on the protein and in the activation of the protein.

It is a primary object of this invention to provide modified acrylonitrile polymers consisting substantially only of protein-acrylonitrile graft copolymers, and to provide improved fibres made thereof.

It is another object of this invention to provide improved, stable, homogeneous and spinnable protein-acrylonitrile graft copolymer solution.

It is still another object of this invention to provide a method for preparing such copolymer solution and also a method for producing improved fibres from such solution.

The accompanying flow sheet is illustrative of the process.

Other objects, features and advantages of this invention will be apparent from the following detailed description.

A spinnable, fibre-forming solution of this invention may be prepared by dissolving a protein and acrylonitrile monomer (grafting monomeric, material) in a concentrated aqueous solution of zinc chloride, and polymerizing the dissolved monomeric material in the presence of the dissolved protein and of conventional catalyst or initiator.

In carrying out the invention, any of animal and vegetable protein materials such as silk fibroin, yeast protein, corn protein, milk casein, soybean protein, gelatin, casein, zein, peanut protein may be used. Synthetic proteins such as copolypeptide of D-glutamic acid and DL-lysine may also be used.

As for the grafting monomeric material, acrylonitrile alone or a mixture of acrylonitrile and one or more vinyl monomers copolymerizable with acrylonitrile may be used. Example of vinyl monomers are methyl acrylate, methyl methacrylate, vinyl acetate, styrene, vinyl chloride, etc. Other vinyl monomers which are well known in the art of acrylonitrile copolymers may also be used. In any case, such vinyl monomers should be those soluble in a concentrated aqueous solution of zinc chloride to form a stable and homogeneous solution with a protein and acrylonitrile. When a monomeric mixture is used it should contain predominant proportions (preferably at least 85% by weight) of acrylonitrile. Thus, the term "acrylonitrile," "acrylonitrile monomer," "monomeric acrylonitrile" or the like as used in this specification is intended to mean not only acrylonitrile itself but also a monomeric mixture of acrylonitrile and one or more of vinyl monomers copolymerizable with acrylonitrile, said mixture containing predominant proportions (preferably at least 85% by weight) of acrylonitrile.

The concentration of an aqueous solution of zinc chloride to be used as the polymerization medium according to this invention should be sufficiently high to permit the graft copolymerization to proceed in a homogeneous solution system from the beginning to the end, or stated differently, the aqueous zinc chloride solution should be in such a high concentration that no graft copolymer produced will precipitate or the polymerization system will not become slurry as the polymerization reaction proceeds. If the polymerization system becomes slurry there would occur tendency toward the formation of undesired homopolymer and the formation of cross-linkage between protein molecules. It has been found that the concentration of zinc chloride in its aqueous solution or aqueous polymerization medium should be at least 40% by weight, preferably from 55 to 62% by weight.

The amount and proportions of a protein and grafting monomeric material to be introduced in the polymerization system are largely optional. Generally, the amount is so selected that the resulting graft copolymer aqueous solution would contain from 4 to 10% by weight, preferably from 6 to 8% by weight of the graft copolymer. The proportions of the protein and grafting monomeric material may be varied depending upon the properties desired for the fibres to be produced. In order to achieve a high dye affinity and other satisfactory properties of the final fibres, copolymer or the fibres are preferable to contain from 10 to 60% by weight, preferably from 25 to 40% by weight of protein component. Therefore, it is preferable that the protein and grafting monomeric material be so selected that fibres with the above specified content of protein are obtained.

In carrying out the polymerization, any of the catalysts or initiators known in the art of polymerization of acrylonitrile may be employed. Examples of useful polymerization catalysts or initiators are water soluble peroxides such as ammonium persulfate, potassium persulfate, hydrogen peroxide and the like, and redox catalytic systems such as of a combination of a peroxide and a sulphite. The polymerization initiator may be added to the polymerization system at a time before the commencement of the reaction. However, if desired, the initiator may be added in installments according to the rate of exhaustion of the same as the reaction proceeds.

The polymerization temperature varies widely (e.g. from 0° C. to 70° C.) depending upon the particular initiator employed. Preferably, the temperature is from 40° C. to 70° C. when a peroxide catalyst or initiator is employed, while when a redox catalyst is employed the polymerization temperature is from 0° C. to 30° C.

The polymerization time also varies widely depending upon the polymerization condition. However, generally, the grafting monomeric material can be graft-copolymerized substantially completely within about one to three hours.

If desired, the following modifications may be made in preparing the spinnable solution according to this invention. One of such modifications is to increase the solubility of protein and to improve resistance of fibres against thermal discoloration by preliminarily cyanoethylating the protein material. The second one is to improve the solution stability of the protein in a zinc chloride aqueous solution in which has been dissolved the protein for subsequent use, the improvement being accomplished by adding a vinyl monomer.

The preliminary cyanoethylation of a protein can be effected by any known manner, such as by treating the protein with acrylonitrile in an alkaline medium but in the absence of a polymerization catalyst. According to this invention, the cyanoethylation can advantageously be effected in combination with the alkali extraction of protein from the protein source material. Thus, for example, when soybean protein is to be extracted from a soybean cake, the extraction is carried out with an alkaline medium, and then acrylonitrile is added to the alkaline extract to effect the cyanoethylation of the protein. Such a preliminarily cyanoethylated protein has a higher solubility in an aqueous solution of zinc chloride than uncyanoethylated protein. When a preliminarily cyanoethylated protein is employed in the graft copolymerization of the invention the resulting copolymer or fibres formed therefrom would have an improved resistance to thermal discoloration. The following table illustrates the effect of preliminary cyanoethylation of protein on the resulting fibres. Graft copolymers of 31% soybean proteins (with various cyanoethylation degrees) and 69% acrylonitrile were wet spun from their solution in zinc chloride aqueous solutions into fibres. Each of the fibres was subjected to a scorch test for 3 minutes to observe the thermal discoloration.

| Cyanoethylation degree of protein employed | Thermal discoloration | | | |
|---|---|---|---|---|
|  | 130° C. | 140° C. | 150° C. | 160° C. |
| 0% | light yellow. | light brown. | deep brown. |  |
| 2% | do | do | do |  |
| 4% | do | do | do |  |
| 6% | White unvaried. | light yellow. | light brown. | deep yel. brown. |
| 8% | do | white | light yellow. | light brown. |
| 10% | do | white unvaried. | white unvaried. | light yellow. |
| 12% | do | do | do | Do. |
| 15% | do | do | do | Do. |
| Polyacrylonitrile alone | do | do | do | Do. |

The degree of preliminary cyanoethylation of protein is preferable to be within the range from 6% to 15% inclusive. If the degree of cyanoethylation is below 6% no desired effect would be expected, while if higher than 15% there would be a tendency toward the gelation of the polymer solution in the polymerization.

As mentioned, according to this invention, an aqueous solution of zinc chloride in which a protein has been dissolved is employed in the polymerization system. As may often happen, it is necessary for some reason or other to store such protein solution for a prolonged period of time such as several days or more before use. However, during such a prolonged starting, a gel-like flock appears on the surface of the solution. Such a flock can hardly be removed by filtration and this makes the subsequent procedure difficult. It has been found that when a vinyl monomer is added to such protein solution, the solution is stabilized against the formation of the gel-like flock, demixing of the protein or phase separation for a prolonged period of time. Preferably such a vinyl monomer is added to the protein solution immediately after the dissolution of the protein in an aqueous solution of zinc chloride. Example of vinyl monomers useful for this purpose are acrylonitrile, methyl acrylate, methyl methacrylate, vinyl acetate, acrylic acid, acrylamide, etc. A mixture of two or more of these vinyl monomers may also be used. The amount of the vinyl monomer(s) to be added should be more than 50%, preferably from 100% to 200%, by weight based upon the protein in the solution. It would be understood that when acrylonitrile monomer is charged into the polymerization system the amount already added to the protein solution for the stabilization should be taken into consideration and deducted.

After the polymerization according to this invention there is obtained a spinnable, viscous, homogeneous, fibre-forming aqueous solution of zinc chloride containing protein-acrylonitrile graft copolymer produced by the polymerization. The polymer solution may be wet-spun into fibres according to a conventional technique.

Thus, for example, the polymer solution, after filtration and degasification in a conventional manner, is extruded through a suitable nozzle or spinnerette in an aqueous coagulating bath containing zinc chloride. The formed and coagulated filaments are washed with water to remove zinc chloride. In order to obtain fibres having excellent physical properties and fine gloss, it is necessary for the filaments after being washed to be drafted while compacting the structure. For this purpose, it is necessary that the filaments, after being washed with water, be drafted while being contacted with a wet medium having a poor affinity with protein but having the property to squeeze out or release the water contained in the filaments. Examples of useful wet medium or saturated or nearly saturated aqueous solutions of a dehydrative neutral inorganic salt such as ammonium sulfate, sodium sulfate, sodium chloride, etc.

More particularly, the following procedures are preferred: The polymer solution is filtered and degasified in a conventional manner, and is then extruded through a suitable nozzle or spinnerette in water or an aqueous solution of zinc chloride (less than 35% by weight in concentration) maintained at a temperature of from $-5°$ C. to $10°$ C. to coagulate the extruded filaments. The coagulated filaments are washed with water at room or lower temperature, and are preliminarily drafted 1.2 to 2 times the initial length in a saturated or nearly saturated aqueous solution of ammonium sulfate, sodium sulfate or sodium chloride at a temperature from $50°$ to $80°$ C., preferably $60°$ C.–$70°$ C. Then the filaments are further drafted 2–8 times the initial length in a similar medium but having a higher temperature such as $100°$ C. or higher, for example, the boiling temperature of the medium. Then the filaments are wound on a collecting bobbin or centrifugal pot at a rate, for example, of 30–200 m. per minute.

The resulting fibres of this invention are excellent in dyeability and in bulkiness. In contrast to those obtained from protein-polyacrylonitrile blends, the fibres of this invention are free from fear of decomposition or putrefaction, have no tendency toward fibrillation, and the protein component in the fibres would not dissolve out upon laundering. The fibres of this invention are excellent in transparency, gloss and mechanical properties, particularly in wear resistance, so that they are very useful for making articles of clothing.

The flow sheet is illustrative of the polymerization, spinnable graft-copolymer solution, and preparation of the final filament.

The invention is further illustrated in the following examples. In these examples, all parts and percentages are by weight unless otherwise indicated.

*Example 1*

A soybean protein (70 parts on dry weight basis) was first dispersed in water, and the dispersion was heated while adding thereto a 60% aqueous solution of zinc chloride. The mixture was stirred for 3 hours at $50°$ C. to dissolve the protein and there were obtained 4715 parts of 60% aqueous solution of zinc chloride with the protein dissolved therein.

A polymerization vessel was charged with said 4715 parts of the aqueous solution and 280 parts of acrylonitrile. The mixture was stirred at $5°$ C. to form a homogeneous system. Then, 9 parts each of a 10% aqueous solution of sodium sulfite and a 10% aqueous solution of ammonium persulfate were added along with 18 parts of a 70% aqueous solution of zinc chloride. The reaction was then initiated with stirring at a polymerization temperature of 20–$22°$ C. After 35 minutes, the same amount of the same type of the polymerization initiators as above was added, and after further 55 minutes the third installment of the initiator was added. After 15 minutes, the stirring was discontinued. At this moment when the stirring was stopped, i.e. a total of 110 minutes after the commencement of the polymerization reaction, the polymerization yield of acrylonitrile was higher than 98%. The resulting solution was slightly opaque and slightly yellow, with a viscosity of about 300 poises. The polymer (protein plus acrylonitrile) concentration of the solution was 7% and the weight ratio of protein to acrylonitrile was 1 to 4. The polymer had an average molecular weight of 58000. In measuring the average molecular weight, the polymer was dissolved in a 50% aqueous solution of sodium rhodanate at $30°$ C. to measure its specific viscosity from which was calculated the intrinsic viscosity $[y]$. The average molecular weight was calculated as follows:

Average molecular weight $= 3.15 \times 10^5 [y]$

A portion of the aqueous solution was coagulated in a 0.5% aqueous solution of acetic acid at $5°$ C. to precipitate the polymer, which washed with water and dried to obtain a white powder. Each of the powdery polymer and the soybean protein used for the graft copolymerization was added to each of the following solvents in a concentration of 1 g./100 cc. and the mixture was left standing overnight at $40°$ C. The results of the experiments are as follows:

| Solvent | Soy bean protein | Polymer |
| --- | --- | --- |
| Dimethylformamide | insoluble | swollen but insoluble. |
| 60% aqueous solution of zinc chloride | completely dissolved. | completely dissolved. |
| 50% aqueous solution of sodium rhodanate | insoluble | Do. |

It is apparent from the above that the protein has been modified by graft copolymerization with acrylonitrile, thereby causing change in solubility. For further test, the polymer was added to and swollen in dimethylformamide. A portion of the resulting dimethylformamide was poured into a large quantity of water. There was observed only a slight degree of turbidity, but no precipitate. This is the evidence that substantially no homopolymer of acrylonitrile was formed in the polymerization process and that the charged acrylonitrile was substantially completely graft-copolymerized with the protein.

The graft copolymer-containing aqueous solution resulted from the polymerization was filtered, degasified and was heated to $70°$ C. just before spinning. The heated solution was extruded through a spin jet of 300 holes (each 0.07 mm. in diameter) into a spinning bath consisting of a 30% aqueous solution of zinc chloride maintained at $-3°$ C. After passing through the spinning bath (1 m. length), the formed and coagulated filaments were allowed to further solidify by passing through a second bath or coagulating bath (length 4 m. and the composition and temperature are same as those of the first or spinning bath) while drafting to 1.1 times the original length by means of rollers. The filaments were then washed with water at $15°$ C. The washed filaments were passed through a bath (length 90 cm.) of a saturated aqueous solution of sodium sulfate at $65°$ C. and were drafted to 1.8 times the initial length by means of rollers during the passage through the bath. Then the filaments were passed through a bath (length 180 cm.) consisting of a saturated aqueous solution of sodium sulfate at $103°$ C. and were drafted to 7 times the initial length by means of rollers during the passage through the bath. Thereafter the filaments were finally wound upon a collecting bobbin at the rate of 40 m./min. The fibres thus obtained were subjected to a stabilization treatment in a saturated aqueous solution of sodium sulfate. The resultant fibres had excellent physical properties as indicated below:

| | |
| --- | --- |
| Fineness _____ deniers__ | 2.3 |
| Dry tenacity _____ g./d__ | 4.3 |
| Wet tenacity _____ g./d__ | 3.6 |
| Knot tenacity _____ g./d__ | 1.5 |
| Dry elongation _____ percent__ | 33.7 |
| Wet elongation _____ do____ | 35.1 |
| Knot elongation _____ do____ | 18.3 |
| Young's modulus _____ kg./mm.$^2$__ | 600 |
| Wear resistance _____ | 3220 (600) |
| Average degree of fibrillation _____ | 1.5 (4) |

The values in parentheses refer to those of the fibres obtained by blending 7% of soy bean protein and 93% of polyacrylonitrile (average molecular weight 77000) with a 60% aqueous solution of zinc chloride as the common solvent, and spinning the same into fibres.

The wear resistance value as given above was expressed by the number of cycles of reciprocation required for a reciprocating sharp edge held against a monofilament under 0.3 g./d. load to break the filament. In determining the degree of fibrillation, the fibres cut into 5 mm. length were charged together with a small amount of water into a juice mixer of 8000 r.p.m. The mixer was driven for 30 minutes to shear the fibres, which were observed through a microscope in comparison with the previously prepared standard samples with different degrees (from 0 to 5) of fibrillation. The sample without any fibrillation was designated as zero (0) in the degree of fibrillation, while the sample completely cracked along the length was designated as 5.

When the fibres obtained as above in this example were readily dyed with several acid dyes, basic dyes and dispersed dyes in a conventional manner to clear, deep shades.

*Example 2*

Acrylonitrile was polymerized in the presence of a milk casein in a 57% aqueous solution of zinc chloride with potassium persulfate as the catalyst and there was obtained a viscous solution (viscosity 150 poises) containing 7.5% of a graft copolymer (protein component/acrylonitrile component being 1/2.5 by weight ratio) having a molecular weight of 48000.

of polyacrylonitrile (average molecular weight 77,000)

After filtration and degasification, the aqueous solution was extruded through a spin jet into a 20% aqueous solution of zinc chloride. The formed and coagulated filaments were washed with water at 15° C. and preliminarily drafted to 1.6 times the original length in a saturated aqueous solution of sodium chloride at 60° C. The filaments were further drafted to 6.5 times the initial length in a saturated aqueous solution of sodium chloride at 102° C. The resulting fibres were white transparent and had a fine gloss. The fibres had excellent physical properties as indicated below:

| | |
|---|---|
| Fineness | deniers 2.1 |
| Dry tenacity | g./d. 3.7 |
| Wet tenacity | g./d. 3.3 |
| Knot tenacity | g./d. 1.4 |
| Dry elongation | percent 34 |
| Wet elongation | do 38 |
| Knot elongation | do 25 |

*Example 3*

Eight hundred grams of defatted soy bean were extracted at 30° C. for 3 hours with 5 kg. of an aqueous solution of caustic soda of pH 11 in an extractor. After the extraction and filtration, the extract was charged in a reaction vessel and heated to 50° C. While keeping this temperature cyanoethylation was effected by adding 50 g. of acrylonitrile and stirring the mixture for 2 hours. At the end of this period the reaction system was cooled to 20° C. and adjusted to pH 4.4 by dropwise adding a 5% sulfurous acid so as to precipitate the protein. The precipitated protein was separated by filtration, washed with water and centrifuged to obtain a pasty cyanoethylated protein with a water content of 60%. The cyanoethylated protein had an excellent degree of whiteness and the degree of cyanoethylation was 9.5%. Fifty grams of this cyanoethylated protein were added to 1300 g. of a 63% aqueous solution of zinc chloride and the mixture was stirred for 1 hour at 50° C. to obtain a transparent homogeneous solution.

To this aqueous solution were added 70 g. of purified acrylonitrile and a catalyst consisting of 3 cc. of a 40% aqueous solution of zinc chloride containing potassium persulfate in an amount of 10 g. per 100 cc. of the solution and 4 cc. of a 40% aqueous solution of zinc chloride containing sodium sulfite in an amount of 10 g. per 100 cc. of the solution. Then the polymerization was continued for 30 minutes at 20° C. while stirring. At the end of this period the same catalyst as above was supplemented in an amount equivalent to ⅓ of the original amount and the polymerization was allowed to continue for another 30 minutes, to obtain a light pink polymer solution having a viscosity of 120 poises. The polymerization yield of acrylonitrile was 99.1%.

After filtration and degasification, the aqueous polymer solution thus produced was extruded through a nozzle of 120 holes (each 0.07 mm. in diameter) into a 25% aqueous solution of zinc chloride at 0° C. The coagulated filaments were washed with water at 20° C. and preliminarily drafted to 1.5 times the original length in a 25% aqueous solution of sodium sulfate, and further drafted to 4 times the initial length in a saturated aqueous solution of sodium sulfate at 103° C. After drafting, the filaments were wound upon a collecting bobbin at a rate of 50 m./min. The resulting fibres were subjected to a stabilization treatment in a relaxed state with a saturated aqueous solution of sodium sulfate for 10 minutes. After drying there were obtained white, glossy, transparent fibres and no voids were observed therein. The fibres had a tenacity of 4.4 g./d. and elongation of 30.5%, and no phase separation was observed by an electron microscope on the cross section of the fibre. The fibres were stable against thermal discoloration. Thus, a scorch tester indicated that the whiteness of the fibres was unaffected upon treatment at 160° C. for 3 minutes. However, the fibres prepared by the same procedure except that the protein employed had not been cyanoethylated turned light yellow upon the same scorch test. The fibres of this example were readily dyed with acid, basic, direct and dispersed dyes in a conventional manner to clear, deep shades.

*Example 4*

Seventy-three grams of scoured silk were dissolved in 3700 g. of a 60% aqueous solution of zinc chloride. To this solution were added 200 g. of purified acrylonitrile and a catalyst consisting of 10 cc. of a 10% aqueous solution of ammonium persulfate and 13 cc. of a 10% aqueous solution of acid sodium sulfite. After polymerization at 10° C. for 1 hour with stirring, there was obtained a light pink, transparent aqueous polymer solution having a viscosity of 150 poises. The polymerization yield of acrylonitrile was 100%.

After filtration and degasification in a conventional technique, the polymer solution was extruded through a nozzle of 24 holes (each 0.06 mm. in diameter) into a 30% aqueous solution of zinc chloride at −2° C. and subjected to 1.5 times cold drafting in a coagulating bath. After washed with water, the coagulated filaments were preliminarily drafted to 1.6 times the initial length in a 40% aqueous solution of ammonium sulfate at 60° C., and further drafted to 3.5 times the initial length in a saturated aqueous solution of ammonium sulfate at 108° C. Then the filaments were wound on a centrifugal pot at a rate of 100 m./min. The resulting cake was dried and then subjected to a stabilizing treatment in a 30% aqueous solution of ammonium sulfate at 103° C., followed by washing with water and drying. There were obtained white transparent fibres having a silky gloss. The fineness was 50 deniers and the monofilament had a tenacity of 4.6 g./d. and elongation of 25%. A fabric made from the fibres had a soft hand and was comparable to silk in slickness and luster. The fabric was readily dyed in a conventional manner with various acid, basic, direct and dispersed dyes to clear, deep shades.

*Example 5*

Five grams of zein were added to 200 g. of a 58% aqueous solution of zinc chloride and the mixture was stirred for 2 hours at 60° C. to dissolve the protein and form a homogeneous solution: To this aqueous solution were added 10.5 g. of acrylonitrile, 1 g. of methyl acrylate and 0.7 cc. of a 10% aqueous solution of ammonium persulfate. The polymerization was continued at 60° C. for 3 hours while stirring and there was obtained a translucent pink viscous solution.

The viscous polymer solution was extruded through a spinnerette into a 30% aqueous solution of zinc chloride at 5° C. After washing with water, the filaments were preliminarily drafted to 1.7 times the initial length in a 20% aqueous solution of sodium chloride and further drafted to 4.5 times the length in a 30% aqueous solution of sodium chloride at 100° C. After stabilizing in an aqueous solution of sodium chloride there were obtained white glossy fibres having a tenacity of 3.8 g./d. and an elongation of 32%. The fibres were readily dyed in a conventional manner with acid and basic dyes to clear, deep shades.

*Example 6*

Four grams of gelatin were dissolved in 300 g. of a 58% aqueous solution of zinc chloride. To this aqueous solution were added 16 g. of acrylonitrile, 5 cc. of a 10% aqueous solution of sodium chlorate and 9 cc. of a 10% aqueous solution of acid sodium sulfite. The polymerization was proceeded at 20° C. for 1.5 hours and there was obtained a light orange, transparent, viscous solution.

The solution was spun, stabilized and treated in the same manner as in Example 3. There were obtained white glossy fibres, which were readily dyed with acid, basic and dispersed dyes to deep shades.

*Example 7*

Eighty grams of peanut protein were added to 3640 g. of a 58% aqueous solution of zinc chloride, and the mixture was stirred at 50° C. for 2 hours. To this solution were added 280 g. of acrylonitrile and 12 cc. of 30% hydrogen peroxide. The polymerization was allowed to proceed at 50° C. for 6 hours to obtain somewhat translucent polymer solution of 160 poises.

This polymer solution was spun and treated in the same manner as in Example 2 and there was obtained an endless yarn having a silky gloss.

*Example 8*

This example illustrates the stabilization of a concentrated aqueous solution of zinc chloride with a protein dissolved therein.

Eleven parts of water were added to 9.1 parts of pasty soybean protein (water content 60%). To the aqueous protein dispersion were added slowly 124 parts of 70% aqueous solution of zinc chloride. The mixture was stirred for 2 hours at 50° C. to dissolve the protein. At the end of this period the transparency of the solution was 0.73 in the light absorbancy when measured by a photoelectric filter phontometer for the wave-length of 610 m$\mu$. When 120% by weight (based on the protein) of acrylonitrile was added to a portion of said solution the light absorbancy was decreased to 0.08 and the resulting solution could be left standing for 8 days at 10° C. without any formation of gel-like flock and without any noticeable change in the transparency. Therefore this solution was very useful for use in the polymerization according to this invention. Similar stabilization effect was also obtained for other protein solutions (in concentrated zinc chloride aqueous solutions) with other vinyl monomers.

*Example 9*

Four parts of copolypeptide (molecular weight 41000) of D-glutamic acid and DL-lysine were dissolved in a 57% aqueous solution of zinc chloride. To this solution were added 10 parts of acrylonitrile, 0.5 part of a 10% aqueous solution of ammonium persulfate and 1 part of a 10% aqueous solution of sodium sulfite. The polymerization was allowed to proceed at 15° C. for 2 hours, and there was obtained a slightly yellow, transparent, viscous solution. The polymerization yield of acrylonitrile was 100%, and the molecular weight of the graft copolymer formed was 62000.

After filtration and degasification, the polymer solution was spun and treated in the same manner as in Example 1. There were obtained white, transparent fibres having a silky gloss. The tenacity of the fibre was 4.2 g./d. and its elongation was 30%.

What we claim is:

1. A method for preparing graft copolymer-containing spinnable solution which comprises (I) dissolving (a) protein and (b) a vinyl monomeric material containing at least 85% by weight of acrylonitrile in a concentrated aqueous zinc chloride solution containing at least 40% by weight of zinc chloride and then (II) polymerizing the dissolved monomeric material in the presence of the dissolved protein at a temperature of from 0° to 70° C., whereby a spinnable solution is obtained, the amount of the protein plus the monomeric material being such that the resulting spinnable solution contains from 4 to 10% by weight of graft copolymer therefrom, and the ratio of the protein to the monomeric material being such that the resulting graft copolymer contains from 10 to 60% by weight of protein component.

2. A method according to claim 1 wherein the aqueous solution of zinc chloride contains from 55 to 62% by weight of zinc chloride.

3. A method as claimed in claim 1 wherein the protein is preliminarily cyanoethylated to a degree of cyanoethylation from 6 to 15%.

4. A method according to claim 1 wherein the protein is preliminarily dissolved in an aqueous solution of zinc chloride and a vinyl monomer is added to the resulting solution to stabilize the same, the amount of the vinyl monomer added being more than 50% by weight based on the weight of protein in the solution.

5. A spinnable, fibre-forming aqueous zinc chloride solution containing 4 to 10% by weight of graft copolymer of protein and monomeric vinyl material containing at least 85% by weight of acrylonitrile, the aqueous solution having a zinc chloride concentration of at least 40% by weight, the copolymer containing from 10 to 60% by weight of the protein component.

6. A method for forming improved fibre which comprises (a) extruding an aqueous solution of claim 5 through a spinnerette into an aqueous coagulating bath containing from 0 to 35% by weight of zinc chloride and having a temperature of from —5° to +10° C., whereby coagulated filaments are formed, (b) washing the filaments with water, (c) preliminarily drafting the washed filaments 1.2 to 2 times their length in a concentrated aqueous salt solution having a temperature from 50° to 80° C., the salt being selected from the group consisting of ammonium sulfate, sodium sulfate and sodium chloride, and then (d) further drafting the filaments to 2 to 8 times their initial length in a similar medium as in the preliminary drafting but at a higher temperature.

7. A spinnable fibre-forming aqueous zinc chloride solution containing 6 to 8% by weight of protein/vinyl monomer graft copolymer, the aqueous solution having a zinc chloride concentration of at least 40% by weight, the vinyl monomer containing at least 85% by weight of acrylonitrile and the copolymer containing from 10 to 60% by weight of the protein component.

8. A spinnable fibre-forming aqueous zinc chloride solution containing from 4 to 10% by weight of protein/vinyl monomer graft copolymer, the aqueous solution having a zinc chloride concentration of at least 40% by weight, the vinyl monomer containing at least 85% by weight of acrylonitrile and the copolymer containing from 25 to 40% by weight of the protein component.

References Cited in the file of this patent

UNITED STATES PATENTS

| | | |
|---|---|---|
| 1,603,080 | Hirasawa | Oct. 12, 1926 |
| 2,356,767 | Kropa | Aug. 29, 1944 |
| 2,822,339 | Hagemeyer et al. | Feb. 4, 1958 |